Dec. 6, 1955 W. H. MacWILLIAMS, JR., ET AL 2,726,330

PULSE ORDERING CIRCUIT

Filed Dec. 23, 1952 4 Sheets-Sheet 1

INVENTORS W. H. MAC WILLIAMS, JR.
F. C. ONG

BY W. L. Dawson

ATTORNEY

PULSE ORDERING CIRCUIT

Filed Dec. 23, 1952 4 Sheets-Sheet 2

INVENTORS W. H. MAC WILLIAMS, JR.
F. C. ONG
BY W. H. Dawson
ATTORNEY

Dec. 6, 1955 W. H. MacWILLIAMS, JR., ET AL 2,726,330

PULSE ORDERING CIRCUIT

Filed Dec. 23, 1952 4 Sheets-Sheet 3

INVENTORS W. H. MAC WILLIAMS, JR.
F. C. ONG

BY W. T. Dawson

ATTORNEY

Dec. 6, 1955 W. H. MacWILLIAMS, JR., ET AL 2,726,330

PULSE ORDERING CIRCUIT

Filed Dec. 23, 1952 4 Sheets-Sheet 4

INVENTORS W. H. MAC WILLIAMS, JR.
F. C. ONG

BY W. L. Dawson

ATTORNEY

United States Patent Office 2,726,330

Patented Dec. 6, 1955

2,726,330

PULSE ORDERING CIRCUIT

Walter H. MacWilliams, Jr., Summit, and Floyd C. Ong, Morris Township, Morris County, N. J., assignors to Bell Telephone Laboratories, Incorporated, New York, N. Y., a corporation of New York Application December 23, 1952, Serial No. 327,618

7 Claims. (Cl. 250—27)

This invention relates to pulse ordering circuits, in which pulses originating at random times in a plurality of incoming channels are transmitted to an equal number of output channels, only at instants specifically allotted to the individual channels, maintaining a one-to-one correspondence between input pulses and output pulses.

The object of the invention is a network interconnecting a plurality of circuits originating pulses at random times and a pulse modifying circuit, arranged to transmit the originated pulses in orderly succession to the pulse modifying circuit, toegther with voltages representing information related to the pulses, and to transmit back to the pulse originating circuits, selected pulses from the pulse modifying circuit.

A feature of the invention is a timing pulse generator and counting ring that generates voltages which, in orderly succession, condition a plurality of gate devices individual to the pulse transmission channels.

Another feature of the invention is a plurality of devices individual to the incoming channels which store the pulses until the corresponding gating device is conditioned by the timing pulse generator, and then release a regenerated pulse to the outgoing channel.

Another feature of the invention is a pluraltiy of gating devices which are energized in orderly succession from the counting ring to transmit from the pulse originating circuits to the pulse modifying circuits voltages representing information related to the pulses from the originating circuits. The output voltages from these gating devices may be individually used in separate portions of the pulse modifying circuit, or alternatively may be combined onto a single lead because only one of the gating devices is energized at a time.

A further feature of the invention is another plurality of gating devices which are also energized in orderly succession by voltages from the counting ring to transmit pulses from the pulse modifying circuit to the pulse originating circuits.

Figures 1, 5:
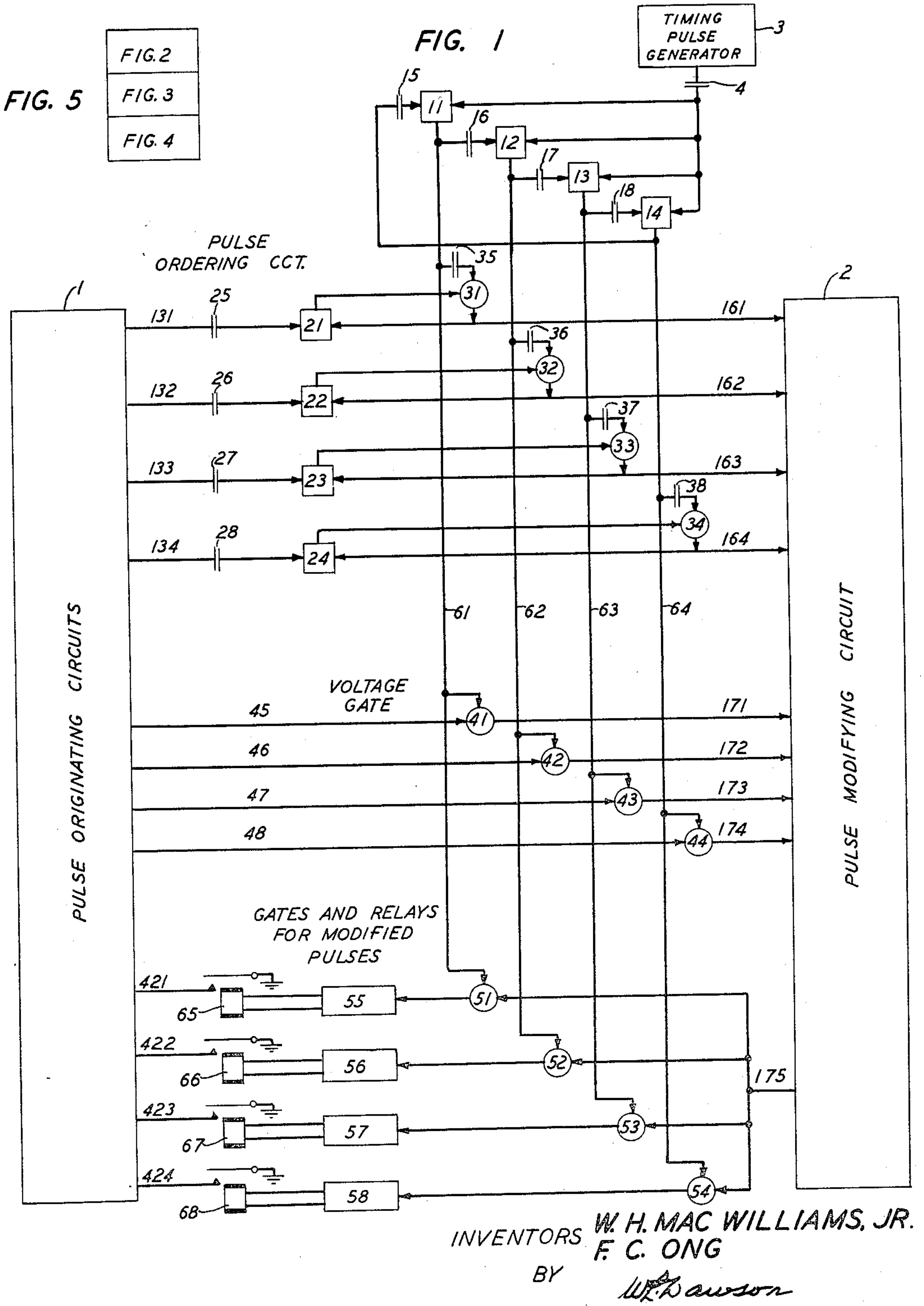
Fig. 1 is a block schematic of a system embodying the invention.
Fig. 5 shows the relationship of Figs. 2, 3, 4.

In Fig. 1, the invention is embodied in a system whereby pulses which originate at random instants in a plurality of channels in the pulse originating circuits 1, and which represent the occurrence of physical events, are transmitted only at regularly timed instants to corresponding output channels connected to a pulse modifying circuit 2, maintaining a one-to-one correspondence between pulses coming from the pulse originating circuits 1 and those going to the pulse modifying circuit 2, and also whereby direct-current voltages which originate in the pulse originating circuits 1 in channels corresponding to the above-mentioned channels, and which represent continuously information relating to them, are transmitted to the pulse modifying circuit 2 during regularly timed intervals.

The pulse modifying circuit 2 is activated by any received pulse and the corresponding direct-current voltage, to determine whether a certain set of conditions are met, and, if so, to send a pulse back through the gates and relays for modified pulses to the pulse originating circuits, so that certain control functions may be initiated.

While, for convenience of description, the invention has been shown embodied in a system for the solution of a particular problem, the invention is not limited thereby, and may be embodied in many other systems. For example, the pulse originating circuits may be part of a telephone switching system which originates a series of pulses upon the receipt of a call, and supplies these pulses together with a voltage or current identifying the pulses, to the pulse modifying circuit. The pulse modifying circuit may, for example, select an idle trunk if any are available, and send back a pulse to connect the incoming line with the trunk. As the pulse originating and pulse modifying circuits may have many forms, and are not a specific element of the present invention, a detailed description thereof is not necessary for a complete understanding of the present invention.

In Fig. 1, the timing pulse generator 3 generates pulses at regular time intervals, which are transmitted through capacitor 4 to restore the chain device 14, which sends a pulse through capacitor 15 to operate chain device 11. The second pulse through capacitor 4 restores chain device 11, which sends a pulse through capacitor 16 to operate device 12. The third pulse restores device 12, which sends a pulse through capacitor 17 to operate device 13; and the fourth pulse restores device 13, which sends a pulse through capacitor 18 to operate device 14. Thus, devices 11, 12, 13, 14 are intermittently operated, in regular order, by the pulses from the timing pulse generator 3.

The random pulses from the pulse originating circuits 1 are respectively applied through connections 131, 132, 133, 134 to capacitors 25, 26, 27, 28 to operate the storage devices 21, 22, 23, 24 which respectively condition the gating devices 31, 32, 33, 34. The operations of devices 11, 12, 13, 14 supply voltages in regular order through capacitors 35, 36, 37, 38 to the gating devices 31, 32, 33, 34 and, if any of these devices has previously been conditioned by the corresponding storage device, it will regenerate the pulse for transmission to the pulse modifying circuit 2, and this pulse will also restore the corresponding storage device.

The voltages from the devices 11, 12, 13, 14 are also supplied in the same regular order over connections 61, 62, 63, 64 to the gating devices 41, 42, 43, 44 which respectively complete the connections 45, 46, 47, 48 from the pulse originating circuit 1 to the connections 171, 172, 173, 174 to the pulse modifying circuit 2.

The voltages from the devices 11, 12, 13, 14 are also supplied in regular order over connections 61, 62, 63, 64 to the gating devices 51, 52, 53, 54. If, during the time one of these gates is operated, a pulse is supplied by the pulse modifying circuit 2 to connection 175, this pulse will be transmitted to the corresponding devices 55, 56, 57, 58 which cause the operation of the corresponding relays 65, 66, 67, 68 grounding the corresponding connections 421, 422, 423, or 424 to the pulse originating circuit 1.

Figure 2:
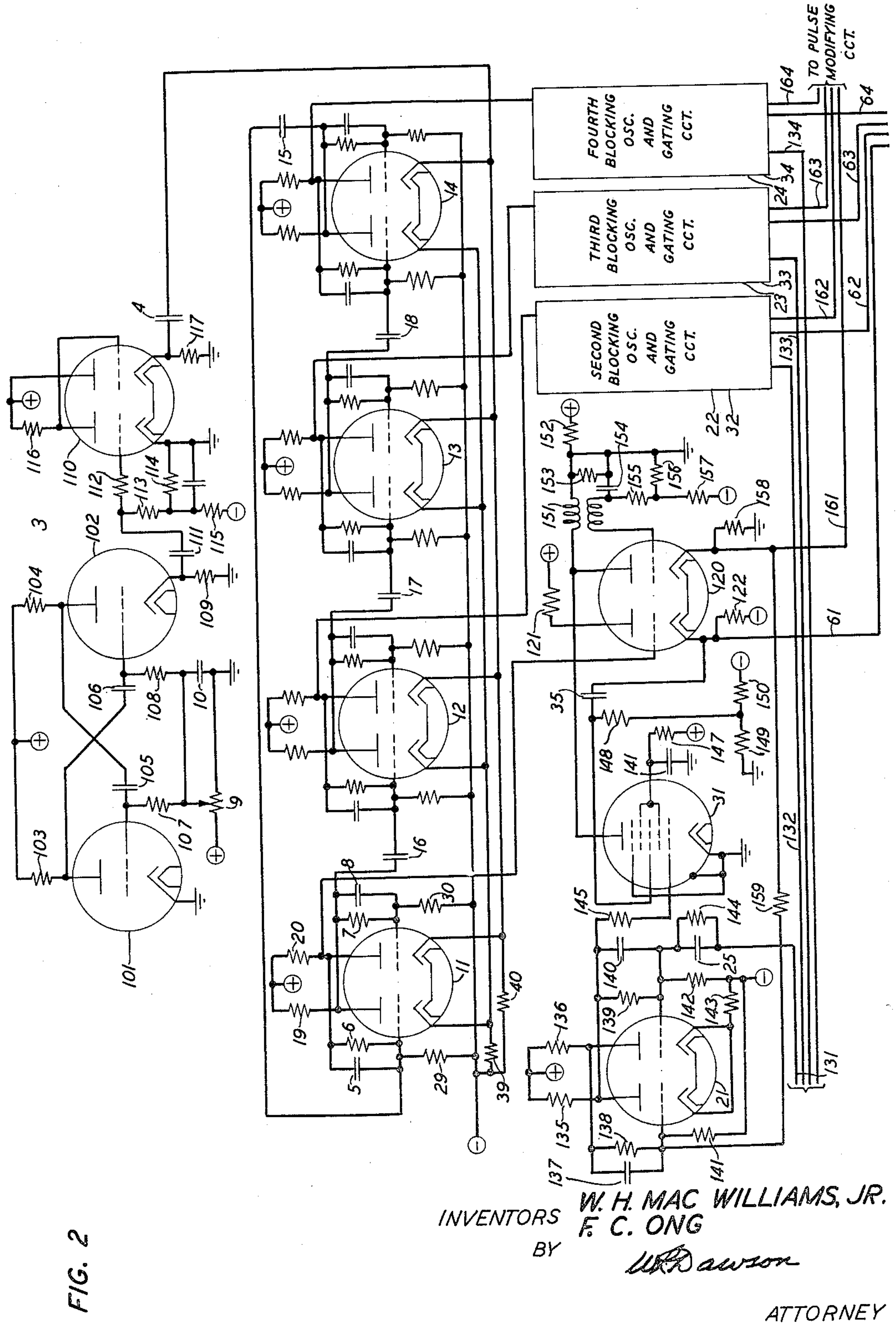
Fig. 2 is a detailed schematic of the timing pulse generator, counting ring, gating devices and pulse storage devices of Fig. 1.

In Fig. 2, the oscillator comprising vacuum tubes 101, 102 and the buffer amplifier 110 together form the timing pulse generator 3 of Fig. 1. Vacuum tubes 101, 102 are respectively connected by resistors 103, 104, to a suitable anode supply; by resistors 107, 108, to a grid biasing potentiometer 9, shunted by capacitor 10; and are cross-connected by capacitors 105, 106, to form an astable, or free-running multivibrator. While, due to the rectangular shape of the output waveform, a multivibrator is peculiarly suitable for this purpose, other known oscillators may be substituted therefor, if found desirable.

The multivibrator is coupled by cathode resistor 109, through capacitor 111, and protective resistor 112 to the control grid of the left triode of tube 110. This control grid is connected by grid leak 113 to the potential divider formed by resistors 114, 115, connected across the bias voltage source (not shown). The anode of this triode is connected through coupling resistor 116 to the anode supply, and is directly connected to the control grid of the right triode of tube 110. The anode of the right triode of tube 110 is connected directly to the anode supply, and the cathode of this triode is grounded through the coupling resistor 117.

When tube 102 becomes conducting, its cathode has a positive potential with respect to ground, thus positive pulses are supplied to the control grid of the left triode of tube 110. These pulses are inverted in the left triode of tube 110, and produce negative variations of voltage across resistor 117.

The twin triode vacuum tubes 11, 12, 13, 14; and associated elements shown in Fig. 2, form the counting ring shown in Fig. 1. The anodes of tube 11 are connected through resistors 19, 20, to the anode voltage source, and the control grids are connected through resistors 29, 30 to the negative bias voltage source. The anodes and control grids of tube 11 are cross-connected by capacitor 5 and resistor 6, and by resistor 7 and capacitor 8, to form a bistable multivibrator. The left-hand cathode of tube 11 is connected through resistor 39 to the bias voltage source, while the right-hand cathode of tube 11 is connected through resistor 40 to the bias voltage source and through capacitor 4 to the right-hand cathode of tube 110. As tubes 12, 13, 14, are similarly connected, a deatiled description of these connections is not necessary.

In order to make the following circuit description more concise, a vacuum tube which is conducting current from anode to cathode will be designated "on;" and a vacuum tube which is not conducting current from anode to cathode will be designated "off."

The circuit of the ring counter is so arranged that after power has been applied, three of the four triodes 11, 12, 13 and 14 will be non-conducting on their left-hand sections and the fourth one will be conducting on its left section. Any one of the four possible initial conditions will serve as a satisfactory starting point. For example, assume that the left triodes of tubes 11, 12, 13, are off, while the right triodes of these tubes are on. The left triode of tube 14 is on, and the right triode of tube 14 is off.

The next negative pulse from tube 110 is applied through capacitor 4 to the cathode of the right triode of tube 14, driving this cathode negative and causing the right triode of tube 14 to conduct, lowering the anode voltage of this triode, thus applying a negative voltage to the control grid of the left triode of tube 14, cutting off conduction in this left triode. The resultant rise in voltage of the anode of the left triode of tube 14 applies a positive pulse through capacitor 15 to the control grid of the left triode of tube 11, causing this triode to conduct. The drop in anode voltage of the left triode of tube 11 is applied through resistor 7 to the control grid of the right triode, cutting off the conduction in this triode. The rise in voltage of the anode of the right triode of tube 11 applies a positive voltage to the control grid of the left triode of tube 120.

This voltage is applied to the control grid of the left triode of tube 120 during substantially the whole interval between pulses from tube 110. The next pulse from tube 110 drives the cathode of the right triode of tube 11 negative, causing this triode to conduct. The potential of the anode of this tube drops, which applies a negative voltage through resistor 6 to the control grid of the left triode of tube 11, cutting off this triode. The consequent rise in potential of the anode of the left triode of tube 11 is applied through capacitor 16 to the control grid of the left triode of tube 12, causing this triode to conduct. The drop in anode voltage of this triode is applied through the cross-connection to the signal grid of the right triode, cutting off the right triode, and applying applied through the cross-connection to the signal grid of While a system for the control of four gating circuits has been disclosed, it is evident that, by changing the number of vacuum tubes in the counting ring, that a greater, or lesser, number of gating circuits may be controlled.

The two triodes of tube 21 are connected to form a bistable multivibrator; the anodes being connected through resistors 135, 136, to the anode supply; the control grids being connected through resistors 141, 142 to the bias supply; the cathodes being connected through resistor 143 to the bias supply, and the anodes and control grids being cross-connected by capacitor 137 and resistor 138, and by resistor 139 and capacitor 140. Normally, the left triode of tube 21 is on, and the right triode is off. The positive pulse from the pulse originating circuit is applied from connection 131, through the parallel combination of capacitor 25 and resistor 144, to the signal grid of the right triode of tube 21, turning on the right triode of tube 21, and, due to the cross-connection, turning off the left triode of tube 21. The charge on capacitor 25 eventually is dissipated in resistor 144. When the left triode of tube 21 is turned off, the anode voltage rises and applies a positive potential through resistor 145 to the first grid of the gating tube 31. Tube 21 is now in an energized state indicating that a pulse has been received from the input connection 131 and has not yet been passed on through to the output connection 161.

The anode of tube 31 is connected through one winding of transformer 151, and resistor 152, to the anode supply, the suppressor grid and cathode are grounded, the screen grid is connected through resistor 147 to the anode supply and through capacitor 146 to ground, and the third grid is connected through biasing resistor 148 to the potential divider formed of resistors 149, 150, connected across the bias supply. The normal voltages applied to the first and third control grids are so chosen that either grid will cut off the conduction of tube 31.

When tube 21 is operated by a pulse from connection 131, the voltage supplied through resistor 145 reduces the bias on the first control grid of tube 31, conditioning tube 31, but this change, alone, is not sufficient to render tube 31 conducting.

The anode of the left triode of tube 120 is connected through resistor 121 to the anode voltage supply, while the cathode of this triode is connected through resistor 122 to the bias voltage supply. The cathode of this triode is connected to connection 61, and is also connected through the capacitor 35 to the third grid of the gating tube 31.

The positive voltage from tube 11 applied to the signal grid of the left triode of tube 120 will cause the cathode voltage of this section to rise and to apply, through capacitor 35, a positive pulse to the third grid of tube 31. If, at this instant, tube 31 has also been conditioned by the operation of tube 21, then tube 31 will become conductive. If tube 21 has not been operated, then tube 31 will not become conductive.

The right triode of tube 120 is connected as a monostable, blocking oscillator. The anode of tube 120 is connected through one winding of transformer 151 to the potential divider formed by resistors 152, 153, connected across the anode supply; the control grid is connected through the other winding of transformer 151 and resistor 155 to the potential divider formed by resistors 156, 157, connected across the bias supply, and is grounded through capacitor 154, and the cathode is grounded through the cathode coupling resistor 158. When tube 31 becomes conductive, the current drawn through the winding of transformer 151 induces a voltage on the signal grid of the right triode of tube 120, causing this triode to act as a blocking oscillator and to produce a short positive pulse across the cathode resistor 158.

The rise of voltage across resistor 158 is applied through resistor 159 to the signal grid of the left triode of tube 21, causing this triode to conduct. The drop in anode voltage of this triode applies a negative voltage through resistor 139 to the signal grid of the right triode of tube 21, cutting off the conduction of anode current in this triode; and also restores, through resistor 145, the negative bias on the first grid of tube 31. The rise in voltage across resistor 158 is also supplied to the pulse modifying circuit 2, over conductor 161.

The pulses from the pulse originating circuits 1 are thus applied by conductors 131, 132, 133, 134 to operate the tubes 21, 22, 23, 24 to respectively condition the gating tubes 31, 32, 33, 34. The pulses from the ring tubes 11, 12, 13, 14, are supplied in regular order to the gating tubes 31, 32, 33, 34, and such gating tubes as have been previously conditioned will be operated by these pulses to energize the corresponding oscillator to regenerate the pulse and to transmit the regenerated pulse on the corresponding conductor to the pulse modifying circuit. The regenerated pulses are thus supplied to the pulse modifying circuit in one-to-one correspondence with the received pulses.

Figure 3:
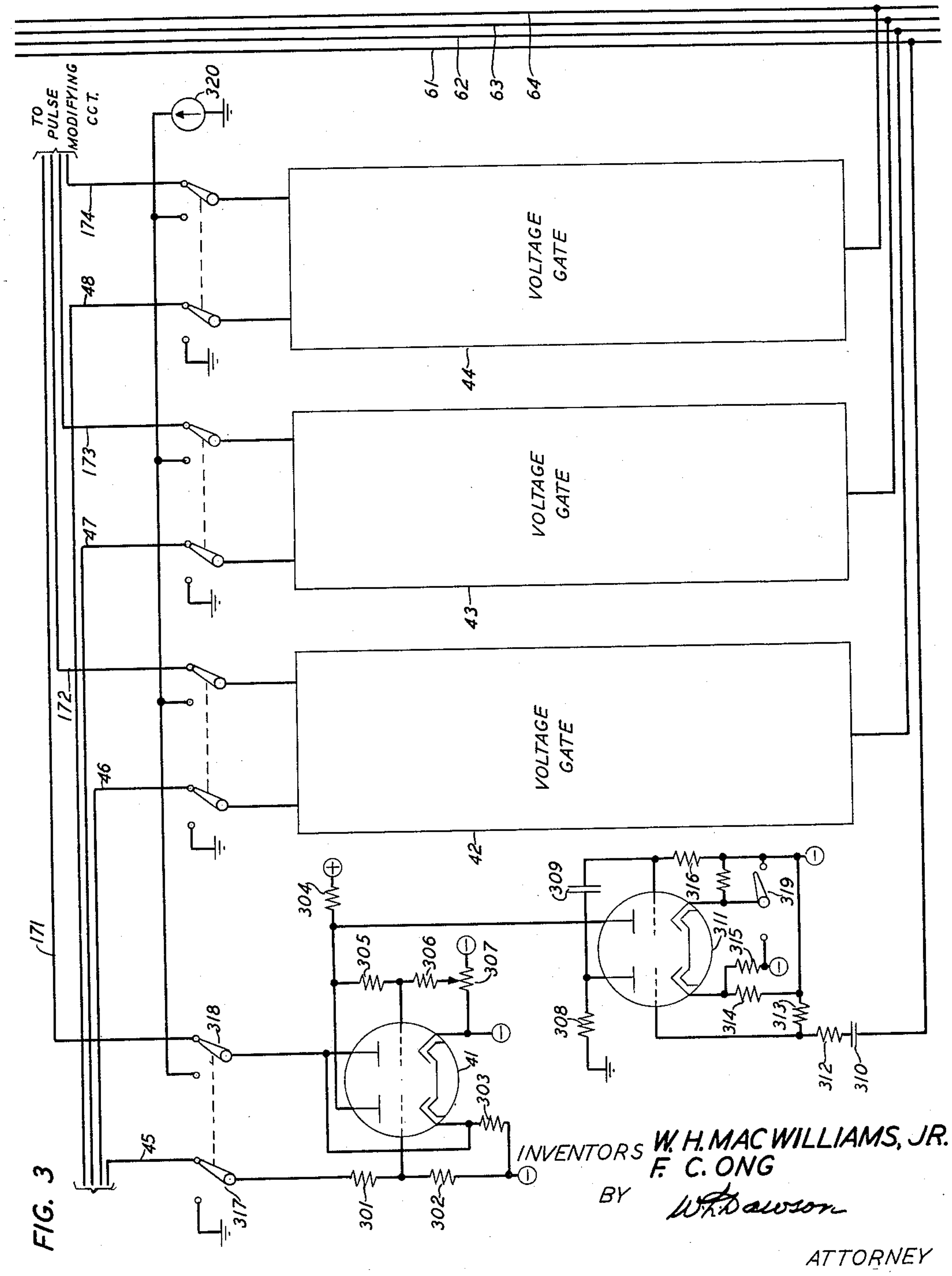
Fig. 3 is a detailed schematic of the votlage gate devices of Fig. 1.

The two triodes of tube 41, Fig. 3, and the right triode of tube 311, respectively, correspond to tubes 10, 20, 30, shown in United States Patent 2,570,225, October 9, 1951, J. H. Felker. The control grid of the left triode of tube 41 is connected through resistor 302 to a source of negative voltage, the cathode of this triode is connected to the same negative source through resistor 303, and the anode is connected through resistor 304 to the anode voltage supply. The anode of the right triode of tube 41 is connected to the cathode of the left triode of tube 41; while the control grid of this right triode is connected through resistor 305 to the anode of the left triode and through resistor 306 to the brush of a potentiometer 307 which is connected between the negative voltage source and the cathode of this triode, which in turn is connected to an appropriate tap on the negative voltage source. The anode of the right triode of tube 311 is connected to the anode of the left triode of tube 41, and the control grid of the right triode of tube 311 is connected through resistor 316 to the cathode of this triode and to the negative voltage source. As the control grid of this triode is connected to the cathode, a large quiescent anode current will flow in this triode, and this current flowing in resistor 304 will produce a voltage drop which reduces the anode voltage of the left triode of tube 41 below the potential of the negative voltage supplied to the cathode, cutting off the conductivity of this triode.

A positive direct-current voltage, the amplitude of which may be used to denote certain information on the channels is applied from the pulse originating circuits by way of conductor 45 through switch 317 and resistor 301 to the control grid of the left triode of tube 41. As the quiescent anode potential of this triode is below that of the cathode, this direct-current voltage does not cause this triode to become conductive.

The anode of the left triode of tube 311 is connected through resistor 308 to ground, and through capacitor 309 to the control grid of the right triode of tube 311. The control grid of the left triode of tube 311 is connected through resistor 312 and capacitor 310 to connection 61 and through resistor 313 to the negative voltage source, while the cathode of this triode is connected to the potential divider formed by resistors 314, 315, connected to taps on the negative voltage source.

When tube 11, Fig. 2, is operated and increases the anode current of the left triode of tube 120, the increase in the voltage drop across resistor 122 is applied through connection 61, capacitor 310, Fig. 3, and resistor 312 to the control grid of the left triode of tube 311, Fig. 3, causing this triode to become fully conductive. Resistor 312 limits the current which may flow if this voltage causes the control grid to become positive with respect to the cathode of this triode.

The flow of anode current in the left triode of tube 311 will reduce the anode potential of this triode, thus applying, through capacitor 309, a negative potential to the control grid of the right triode of tube 311, cutting off the conduction in this triode. By cutting off the anode current of the right triode of tube 311, the anode of the left triode of tube 41 is energized and the current which flows in the left triode produces a drop across resistor 303 which is very nearly equal to the direct-current voltage applied to the left grid from the pulse originating circuits 1 through conductor 45, switch 317 and resistor 301. The voltage developed across resistor 303 is supplied through switch 318 and conductor 171 to the pulse modifying circuit.

To adjust the gating circuit, the switches 317, 318 and 319 are moved to their left contacts. In this position, switch 317 grounds the left-hand grid of tube 41 through resistor 301, switch 318 grounds the anode of the right triode of tube 41 through meter 320 and switch 319 cuts off conduction in the right triode of tube 311 by returning its cathode to a less negative tap on the negative supply. Potentiometer 307 is then adjusted until meter 320 reads zero.

The voltage gates 42, 43, 44, are identical with the voltage gate 41 including control tube 311. Thus, each time that the ring circuit energizes one of the gating tubes in one of the pulse transmission channels, the corresponding voltage gate is energized to supply the proper direct-current voltage to the pulse modifying circuit.

Figure 4:
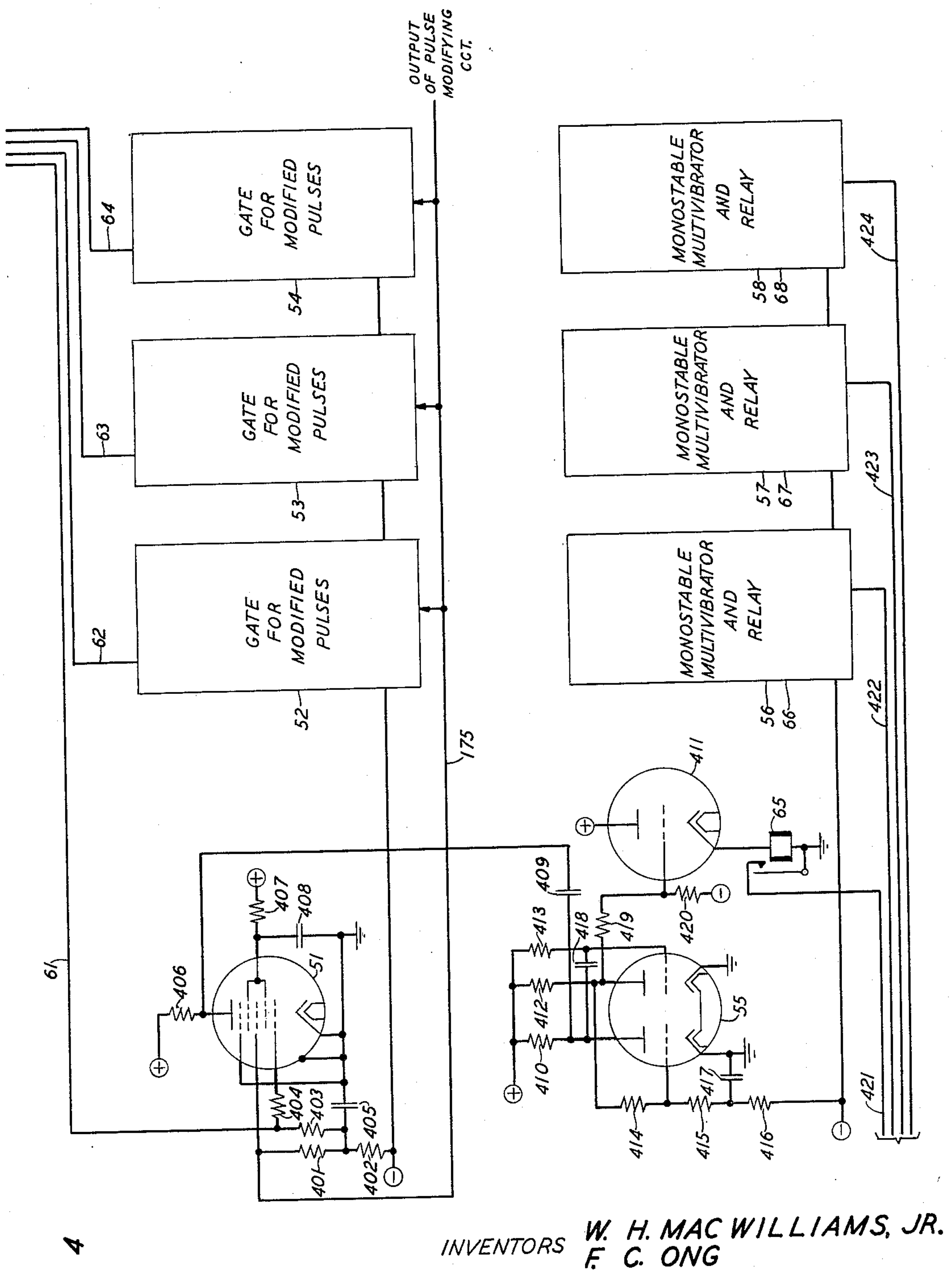
Fig. 4 is a detailed schematic of the pulse gates and relays shown in Fig. 1.

The first grid of the gating tube 51, Fig. 4, is connected through resistors 402, 403, 404, to a tap on the bias voltage supply; the third grid is connected through resistors 401, 402, also to the negative voltage supply; the anode is connected through resistor 406 to the anode voltage supply; the screen grid is connected through resistor 407 to the anode voltage supply and through capacitor 408 to ground; the cathode is grounded; and the grid circuits are connected through capacitor 405 to ground. The first and third grids are biased so that either grid alone will cut off conduction in the tube.

When the associated tube in the counting ring is operated, a positive voltage is applied by connection 61 through resistor 404 to the first grid of tube 51. This voltage alone is not sufficient to render tube 51 conductive. If, however, during the time that this voltage is applied to the first grid a positive pulse is received from the pulse modifying circuit by connection 175 and applied to the third grid, then tube 51 will become conductive. The consequent drop in anode voltage of tube 51 applies a negative voltage through capacitor 409 to the anode of the left triode of tube 55, and through capacitor 418 to the control grid of the right triode.

Tube 55 is connected as a monostable multivibrator, in which the anodes are respectively connected through resistors 410, 412, to the anode voltage supply; the cathodes are grounded; the control grid of the left triode is connected through resistor 414 to the anode of the right triode, and through resistors 415, 416, to the bias voltage supply; the control grid of the right triode is connected through capacitor 418 to the anode of the left triode and through resistor 413 to the anode voltage supply. The junction of resistors 415, 416 is grounded through capacitor 417. The control grids are biased so that, in the quiescent condition the left triode is cut off, and the right triode is conducting. When tube 51 becomes conductive, the negative voltage applied through capacitor 418 to the control grid of the right triode of tube 55 cuts off this triode, and the rise in anode voltage of this triode applies a positive voltage through resistor 414 which overcomes the bias voltage and renders the left triode fully conductive. When the right triode of tube 55 is cut off, the anode voltage rises applying a positive voltage through resistor 419 to the control grid of tube 411. The pulse from tube 51 is of short duration, and, after this pulse has passed, capacitor 418 is slowly recharged through resistor 413 until the bias on the control grid of the right triode is reduced to a value which renders this triode conductive, reducing the positive voltage supplied to the control grid of the left triode of tube 55, restoring tube 55 to the quiescent condition, and reducing the positive voltage supplied to the control grid of tube 411.

The anode of tube 411 is connected to the anode voltage supply, the cathode is connected through the winding of a relay 65 to ground, and the control grid is connected through resistor 420 to the bias voltage source, so that in the quiescent condition, tube 411 is cut off. When a positive voltage is applied through resistor 419 to the control grid, current will flow through tube 411 and the winding of relay 65, operating relay 65, and holding this relay operated until tube 55 restores. The time constant of capacitor 418 and resistor 413 is chosen large enough so that relay 65 stays operated long enough to perform certain control functions, and small enough so that the positive voltage is removed from tube 411 before the next operation of tube 51. The contacts of relay 65 may be connected by connection 421 to control any desired device, such as a register or recorder, associated with the pulse originating circuits.

The pulse gates 52, 53, 54, for the other channels are similar to the gate 51; the multivibrators 56, 57, 58, are similar to the multivibrator 55, and respectively control the relays 66, 67, 68.

What is claimed is:

1. In a pulse ordering circuit, a plurality of output channels, a plurality of pulse generators individually connected to said output channels, a plurality of electronic gating devices, each having two control electrodes, each normally biased to cut off the gating device, and an output electrode individually connected to a pulse generator, a ring of counting devices individually connected to the first control electrode of the gating devices, means for successively and recurrently energizing said counting devices, a plurality of input channels corresponding to said output channels and energized at random intervals by electrical pulses, a plurality of storage devices individually connected to said input channels and individually connected to the second control electrode of the gating devices, and individual connections from the pulse generators to the corresponding storage devices, whereby in each individual channel an input pulse occurring at a random instant energizes the storage device which in turn energizes the second control electrode of the gating device, so that when the recurrently occurring voltage from the counting ring is applied to the first control electrode of the gating device to complete its energization, the gating device in turn energizes the corresponding pulse generator to supply an output pulse to the channel and to restore the storage device to receive a subsequent input pulse.

2. The combination in claim 1 with a plurality of incoming channels transmitting voltages related to the pulses in said input channels, a corresponding plurality of outgoing channels, and a plurality of gating devices respectively connecting the incoming and outgoing channels, each gating device having a control element connected to the corresponding counting device.

3. The combination in claim 1 in which said output channels are connected to a pulse modifying circuit, a plurality of return channels connecting said pulse modifying circuit to a plurality of relay devices corresponding to said return channels, and a plurality of gating devices having output circuits respectively connected to said relays, first control elements respectively connected to said return channels and second control elements respectively connected to said counting devices.

4. In a pulse ordering system, a plurality of input channels energized at random times by electrical impulses, a plurality of storage devices each connected to one of said input channels and capable of energization by the impulses in the connected channel, a plurality of output channels corresponding with the input channels, a plurality of pulse generators each connected to one of said output channels, and to the corresponding storage device, a gating device associated with each input channel and having a first control element connected to the storage device in the channel, an output circuit connected to the pulse generator in the channel, and a second control element, a ring of counting devices respectively connected to the second control elements of said gating devices, and means for successively and recurrently during regular intervals energizing said counting devices, whereby the incoming impulses, occurring at random times, condition the first electrodes of the gating devices and the counting devices successively and recurrently complete the energization of the gating devices which in turn trigger pulse generators to supply pulses in one-to-one correspondence with the input impulses to the corresponding output channels, and to restore the corresponding storage devices.

5. In a pulse ordering system, a plurality of input channels each having a bistable multivibrator connected therein capable of being operated by electrical impulses supplied to the channels at random times, a corresponding plurality of blocking oscillators each connected to an individual output channel and to the corresponding multivibrator, a corresponding plurality of electronic counting devices, a gating device for each oscillator having an output circuit connected to the oscillator, a first control element connected to the corresponding multivibrator and a second control element connected to the corresponding counting device, and means for successively and recurrently during regular intervals energizing said counting devices, whereby the counting devices successively and recurrently condition the gating devices, and, at random times, the incoming impulses operate the multivibrators to complete the energization of the gating devices to energize the blocking oscillators to regenerate the pulses in the output channels in regular order and one-to-one correspondence with the input impulses, and to restore the corresponding multivibrator.

6. The combination in claim 5 with a plurality of incoming channels transmitting voltages related to the impulses in the input channels, a corresponding plurality of outgoing channels, and a plurality of gating devices respectively connecting the incoming and outgoing channels, each gating device having a control element connected to the corresponding electronic counting device, whereby only a single outgoing channel at a time transmits a voltage.

7. The combination in claim 5 in which said output channels are connected to a pulse modifying circuit, a plurality of return channels connecting said pulse modifying circuit to a plurality of relay devices corresponding to said return channels, and a plurality of gating devices having output circuits respectively connected to said relays, first control elements respectively connected to said return channels and second control elements respectively connected to said counting devices.

References Cited in the file of this patent

UNITED STATES PATENTS

| | | |
|---|---|---|
| 2,418,521 | Morton et al. | Apr. 8, 1947 |
| 2,577,141 | Mauchly et al. | Dec. 4, 1951 |
| 2,666,868 | McMillan | Jan. 19, 1954 |